April 6, 1937.  C. E. REED  2,076,001
ROLLER CUTTER SPINDLE AND ANTIFRICTION ASSEMBLY
Filed Aug. 7, 1935

Inventor:
Clarence E. Reed,
By Spear, Donaldson & Hull
Attorneys

Patented Apr. 6, 1937

2,076,001

UNITED STATES PATENT OFFICE 2,076,001

ROLLER CUTTER SPINDLE AND ANTI-FRICTION ASSEMBLY

Clarence E. Reed, Wichita, Kans., assignor to Chicago Pneumatic Tool Company, New York, N. Y., a corporation of New Jersey Application August 7, 1935, Serial No. 35,188

16 Claims. (Cl. 255—71)

The invention relates to roller cutter and anti-friction bearing assemblies for earth boring drills, and consists in the features and combination and arrangement of parts hereinafter described and particularly pointed out in the claims.

In the accompanying drawing—

Figure 1:
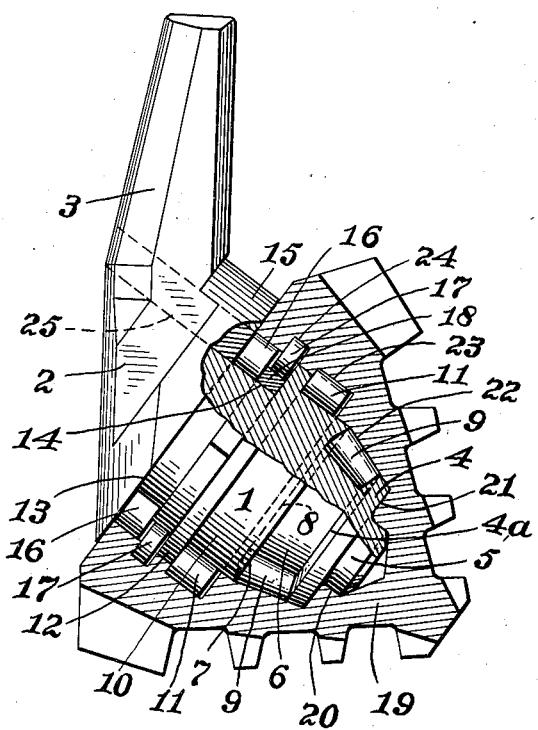
Figure 1 is a view partly in side elevation and partly in section of the invention.
Figure 2:
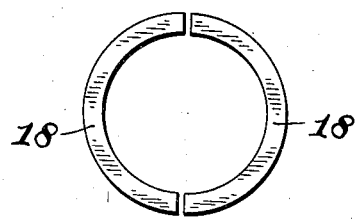
Fig. 2 is a face view of a split ring constituting one of the elements of the assembly.

In this drawing 1 indicates a spindle which is formed in one piece with its support 2, the latter being adapted to be attached by welding or in any other suitable way to a bit head. The spindle projects downwardly and inwardly towards the vertical axis of the drill, which would be represented in the drawing by a vertical line adjacent the apex of the roller cutter 19, the upper stem portion 3 of the support reaches up vertically, and consequently at an angle to the axis of the spindle to connect with the bit head. This spindle has a flange 4 near its free end and a reduced cylindrical portion 5. It is provided with a groove 6 defined on one side by the inclined side face 4a of the flange 4 and on the other side said groove is defined by a shoulder 7 which is undercut as indicated in the dotted line at 8.

In this groove are located frusto-conical rollers 9, it being noted that the bottom of the groove, or in other words, the surface upon which the frusto-conical rollers bear, is of frusto-conical form. The spindle is also provided with a cylindrical portion 10 affording a bearing surface for rollers 11. The spindle has a flange 12 of larger diameter than the cylindrical surface 10 of the spindle and the rollers 11 find a bearing surface against the side face of this flange.

The flange 12 and a surface 13 provide the side walls of a groove formed on the spindle, the bottom of which is the cylindrical surface 14. The surface 13 is provided by the lateral face of the base portion of the spindle indicated at 15, this surface 13 being in a plane at right angles to the axis of the spindle. In this groove are located anti-friction rollers 16 and partly in this groove are located locking rollers 17 and a split ring 18.

A one piece cutter is indicated at 19, this cutter having a bore formed to fit the contour made up of the spindle construction and the several anti-friction bearings above mentioned. In detail this bore near the apex of the cutter has a cylindrical wall 20 to bear on the reduced extension 5 at the end of the spindle, and it has a wall portion 21 to bear on the outer face of the flange 4 frictionally to take end thrust of the cutter.

There is also provided a frusto-conical wall portion 22 to bear on the frusto-conical rollers 9. For receiving the rollers 11 the wall of the cutter bore is provided with a groove 23 and to receive the locking rollers 17 the wall of the cutter bore is grooved at 24.

In making the assembly the frusto-conical rollers 9 are placed in the groove 6 in the spindle; the rollers 11 are placed in the groove 23 of the bore of the cutter, and the locking rollers 17 are placed in the groove of the spindle with their faces against the shoulder provided by the side of said groove, which as above described, is partly provided by the flange 12. This flange 12 is an integral part of the spindle. The segmental ring in making the assembly is placed in the groove defined by the flange 12, the surface 13 and the surface 14, said ring lying at a point between the rollers 17 and the face 13 of the base 15. With the parts thus assembled the one piece roller cutter can be passed over the spindle into the position shown in Fig. 1, it being understood that in this action no obstruction to the placing of the roller cutter will be offered by the locking rollers 17 because at this period in the process of assembly said rollers will be lying wholly within the groove at 14 with no portion of said rollers projecting beyond the joint between the spindle and the roller cutter.

With the parts thus far assembled a suitable tool may be introduced through an opening 25, and thereby the locking rollers are pushed radially outward into place lying partly within the groove of the cutter and partly in the space or groove on the spindle provided between the flange 12 and surface 13 and of which groove the bottom is the surface 14. The locking rollers lie with their side faces against the wall of the groove provided by the flange 12 of the spindle which flange forms a part of the one piece spindle. The sections of the split ring are now pushed into operating position between the inner peripheral faces of the locking rollers and the spindle so that the locking rollers will be maintained in their working positions to lock the roller cutter rotatively on the spindle. Next the roller bearings 16 are inserted through the hole in the support into the bore of the cutter at the base thereof. The hole is next closed by a suitable plug and the inner face of this being flush with the face 13 of the base of the spindle there will be no obstruction offered to the movement of the bearing rollers. The face 13 is not intended to be a bearing surface sustaining cutter thrusts in normal operations. The hole 25 is merely an assembly convenience. All operating thrusts of the cutter are sustained by the spindle. It is not to be understood that either the hole 25 or the plug therein, would constitute an obstruction, or interruption of bearing surface. If the hole were not closed by a plug heavy mud would enter and constitute an obstruction to the movement of the rollers. The frusto conical rollers relieve the rollers in the base of the cutter from end thrusts towards the face 13. The base rollers sustain only radial thrusts. The bore at the base of the cutter is open through the base face thereof. It is cylindrical and complementary to the cylindrical periphery or surface 14 of the spindle at this zone. Both of these cylindrical surfaces are unbroken and therefore the rollers in the extreme base bore of the cutter find smooth continuous surfaces upon which to roll, without crossing any joints between parts of the assembly. All of the rolling bearings, except the locking rollers, take radial loads.

The locking rollers take only end thrusts. The frusto-conical rollers take end thrust of the cutter outwardly towards its support, and also radial loads. The reduced cylindrical end of the spindle takes radial loads frictionally, and the end face of the spindle body and the flange at the free end of the spindle take end thrust of the cutter frictionally. The ring made up of the segments is capable of floating or moving circumferentially about the spindle while the locking rollers run thereon.

It will noticed that with the arrangement described the locking rollers abut with their side faces a shoulder or flange in one piece with the spindle.

The invention is not limited to the use of rollers as anti-friction bearing means.

The roller cutter is of frusto-conical form with teeth on the base zone at an obtuse angle to the frusto-conical zone nearer the apex, the latter zone having spaced apart rows of teeth widely spaced apart.

If desired, for any reason, the locking rollers 17 may be inserted through the opening 25, in the manner described in my co-pending application executed July 29, 1935, Serial Number 34,443. In that event the relative diameters of the parts involved would be proportioned to each other to allow the locking rollers readily to enter through the bore of the cutter at the base thereof.

That wall of the groove 24 which lies to the left of the rollers 17 as represented in the drawing may be regarded as a shoulder engaging the said roller on one side thereof while the left hand side face of the part 12 of the spindle may be regarded as a shoulder engaging the other side face of the said locking roller 17.

I claim:

1. A roller cutter, spindle and anti-friction bearing assembly for earth boring drills comprising a one piece spindle, a one piece roller cutter mounted on the spindle, rolling bearings for locking the roller cutter on the spindle rotatively, said rolling bearings engaging the wall of a groove in the cutter and engaging a shoulder on the spindle in one piece therewith located between said rolling bearings and the free end of the spindle, and additional rolling bearings in the cutter bore engaging the wall thereof and the spindle, and located intermediate the locking rolling bearings and the base face of the cutter to take radial loads, substantially as described, a spindle support having a gateway through which the locking rollers are accessible and the additional roller bearings are insertable after the cutter is assembled on the spindle, said cutter and spindle having their complementary bearing surfaces unbroken for the rolling thereon of said rolling bearings.

2. A roller cutter organization for earth boring drills comprising a spindle having an annular shoulder in one piece therewith, a roller cutter mounted on the spindle, rolling bearings engaging said shoulder on the spindle and a shoulder on the cutter for rotatively locking the cutter on the spindle and a split ring surrounding a portion of the spindle and furnishing a track for the locking rolling bearings to run on, said track maintaining said locking rolling bearings in engagement with the shoulder on the cutter, substantially as described.

3. In combination, a spindle and support in one piece, said spindle having adjacent the support an annular groove with a cylindrical bottom wall, said spindle having also an annular shoulder intermediate its length and an annular flange at its free end with a frusto-conical bearing surface between said shoulder and flange, frusto-conical roller bearings on said frusto-conical surface, cylindrical roller bearings between the spindle and the cutter located at a zone intermediate the said spindle groove and the free end of the spindle, locking rolling bearings together with a split ring and other roller bearings in the said spindle groove, said spindle support having a gate opening leading to the spindle groove through which said other roller bearings are inserted, and a roller cutter mounted on the spindle and having a shoulder engaged by said locking rolling bearings, and surfaces to engage the frusto-conical rollers, the cylindrical roller bearings and said other roller bearings, said split ring being shiftable from a position alongside the locking rollers to a position under said locking rollers and being held in place by said other rollers, substantially as described.

4. A roller cutter assembly for an earth boring drill including a spindle having one free end, a roller cutter mounted on the spindle and enclosing the free end of said spindle, anti-friction rolling bearing means located between the cutter and spindle engaging a shoulder on the spindle and engaged by a wall of the cutter bore to sustain end thrust of the cutter in a direction outwardly from the axis of rotation of the drill, an integral shoulder on the spindle contacting locking elements positioned in a groove in the bore wall of the cutter, a segmental ring between the locking elements and said spindle for holding the locking elements in operative position, and other rolling bearings between said cutter and spindle.

5. In combination in a roller cutter assembly for an earth boring drill, a spindle in one piece having a free end and having peripheral bearing surfaces, each of which bearing surfaces extends circumferentially of the spindle, a roller cutter mounted on said spindle and enclosing the free end of the spindle, rotative locking elements between the cutter and spindle engaging an annular shoulder of the cutter and a shoulder on the spindle, and a segmental ring between the said locking elements and the periphery of the spindle upon which said elements run, and rolling bearings engaging the said peripheral bearing surfaces of the spindle and the wall of the cutter bore, substantially as described.

6. In combination in a roller cutter assembly for an earth boring drill an approximately frusto conical roller cutter having a bore opening through the base face thereof and enclosing therein the free end of a spindle on which said cutter is mounted, a spindle having a plurality of circumferentially extending bearing surfaces formed on its periphery each without aperture or interuption thereof, said surfaces being engaged by the roller cutter rolling bearings and rotative locking means within the cutter bore at the base thereof, said rolling bearings being insertable to operating position through the bore opening at the base face of the cutter and said locking means being accessible through said bore opening, and a segmental ring positioned between the locking elements and the periphery of the spindle.

7. A roller cutter assembly comprising an approximately frusto-conical roller cutter having a bore opening through its base face, a spindle having a free end and a plurality of circumferentially extending spaced apart bearing areas, said spindle having an annular shoulder, said roller cutter being mounted on said spindle and enclosing the free end thereof, rolling locking means engaging the roller cutter and said shoulder, a segmental ring engaging the rolling locking means to hold said means in place, and rolling bearings running on the said bearing areas of the spindle and engaging the wall of the bore of the roller cutter, substantially as described.

8. A roller cutter and spindle assembly for earth boring drills comprising a spindle in one piece, a cutter in one piece, each having a shoulder, rotative locking members engaging the said shoulders for rotatively locking the roller cutter on the spindle, a segmental ring on which said locking members run, and which ring maintains the rotative locking means in locking position engaging the shoulder on the cutter, said cutter having a bore receiving the rotative locking means and the ring, said ring and rotative locking means initially being positioned side by side axially in the cutter bore upon assembling the cutter on the spindle, the rotative locking means being shiftable radially outward to engage the shoulder on the cutter at the same time remaining in engagement with the shoulder on the spindle, and the ring being shiftable into position for the rotative locking means to run thereon, and means for holding the ring in the last mentioned position, substantially as described.

9. A roller cutter and spindle assembly according to claim 8 in which roller bearings between the cutter and spindle hold the segmental ring in place.

10. A roller cutter and spindle assembly according to claim 8 in which roller bearings between the cutter and spindle hold the segmental ring in place, a spindle support having a gateway permitting the insertion of said roller bearings into place, and a member for closing the gateway to hold said rolling bearings in operative position.

11. In combination in a roller cutter and bearing assembly for earth boring drills, a spindle support, a spindle, in one piece, projecting from the support and having a free end, a frusto-conical raceway adjacent the free end of the spindle, a cylindrical raceway on the spindle located at a zone between said frusto-conical raceway and the spindle support, said frusto-conical raceway being defined at its larger diameter end by an annular shoulder on the spindle, frusto-conical roller bearings in the frusto-conical raceway having their larger diameter end faces engaging said annular shoulder, cylindrical roller bearings on the cylindrical raceway of the spindle, a frusto-conical roller cutter embracing the free end of the spindle and having raceways complementary to the frusto-conical and cylindrical raceways of the spindle and contacted by said frusto-conical and cylindrical roller bearings, said cylindrical roller bearings taking radial loads and the frusto-conical rollers taking both radial loads and also end thrust of the cutter outwardly towards the spindle support, and rolling means engaging a shoulder on the roller cutter and a shoulder integral with the spindle for rotatively locking the cutter on the spindle, substantially as described.

12. A roller cutter and bearing assembly for earth boring drills according to claim 11 in which the said rotative locking means is located at a zone intermediate the zones in which the frusto-conical and the cylindrical roller bearings respectively lie, substantially as described.

13. In combination, a spindle support, a spindle projecting from the support and having an annular shoulder near its base, with a cylindrical raceway between said shoulder and the support, a roller cutter mounted on the spindle and having a cylindrical raceway in its base complementary to the cylindrical raceway on the spindle, and spaced apart therefrom, locking rollers of a diameter to initially rest peripherally upon the cylindrical raceway of the spindle, and to be shielded from locking engagement with the cutter, while said cutter is being mounted on said spindle, said cutter having an annular groove in the wall of its bore to receive said locking rollers when moved radially outward, a segmental ring adapted to lie initially on the said cylindrical raceway of the spindle alongside the locking rollers when the latter are in their initial position, and to be moved to position for forming a track for the locking rollers to run on when the said rollers are positioned to engage said cutter groove, roller bearings between the base portions of the spindle and cutter engaging the said cylindrical raceways and taking radial loads, and, with their side faces, engaging the segmental ring to hold it in place within the row of locking rollers, said spindle support having a gateway through which the said roller bearings are inserted into place, and means for closing said gateway, substantially as described.

14. In combination in a roller cutter assembly, a spindle support, a spindle projecting therefrom with one end free, said spindle having an annular flange, and a cylindrical raceway at each side of said flange, locking rollers engaging said flange, a segmental ring holding said locking rollers in operative position, roller bearings on that one of the cylindrical raceways which is nearest the spindle support, and retaining the ring in position, roller bearings on the other cylindrical raceway adjacent said flange and a roller cutter having an annular groove in the wall of its bore receiving portions of the locking rollers and having cylindrical raceways, complementary to the cylindrical raceways of the spindle, engaged by the roller bearings, substantially as described.

15. A roller cutter assembly according to claim 14 in which the spindle is of frusto-conical form adjacent its free end and is provided with a frusto-conical raceway, and frusto-conical bearing rollers running on said raceway engaging a complementary raceway of the wall of the cutter bore, all of the roller bearings taking radial loads from the cutter, and said frusto-conical rollers additionally taking on their peripheries end thrust of the cutter outwardly towards the spindle support, substantially as described.

16. In combination, a spindle support, a spindle projecting therefrom having a free end, a frusto-conical roller cutter mounted on the spindle, rolling bearings between the spindle and the cutter at the base portions thereof to take radial loads, said cutter having an annular shoulder on the wall of its bore, and said spindle having an annular shoulder complementary to and spaced apart from the said shoulder on the cutter, said shoulders lying in a zone nearer to the apex of the cutter than the zone occupied by said rolling bearings, rolling bearings located between and engaging said shoulders for rotatively locking the cutter on the spindle, adjustable means for retaining the rotative locking means in engagement with the cutter shoulder after said locking means is moved radially outward relative to the spindle axis to engage the cutter shoulder, the said spindle support having a gateway therethrough whereby access may be had to the said locking means and retaining means therefor for their adjustment to operative position, and whereby the rolling bearings first mentioned may be inserted into operative position, substantially as described.

CLARENCE E. REED.